(No Model.) 4 Sheets—Sheet 1.

C. W. SIEMENS.
Glass-Melting Furnace.

No. 230,668. Patented Aug. 3, 1880.

Witnesses:
M. M. Bastick
M. M. Johnson

Inventor
C. W. Siemens
by S. Whitman Atty.

(No Model.) 4 Sheets—Sheet 2.

C. W. SIEMENS.
Glass-Melting Furnace.

No. 230,668. Patented Aug. 3, 1880.

(No Model.) 4 Sheets—Sheet 3.

C. W. SIEMENS.
Glass-Melting Furnace.

No. 230,668. Patented Aug. 3, 1880.

(No Model.)  4 Sheets—Sheet 4.

C. W. SIEMENS.
Glass-Melting Furnace.

No. 230,668. Patented Aug. 3, 1880.

UNITED STATES PATENT OFFICE.

CHARLES WILLIAM SIEMENS, OF WESTMINSTER, ENGLAND.

GLASS-MELTING FURNACE.

SPECIFICATION forming part of Letters Patent No. 230,668, dated August 3, 1880.

Application filed June 14, 1880. (No model.) Patented in England April 28, 1875.

*To all whom it may concern:*

Figure 1:
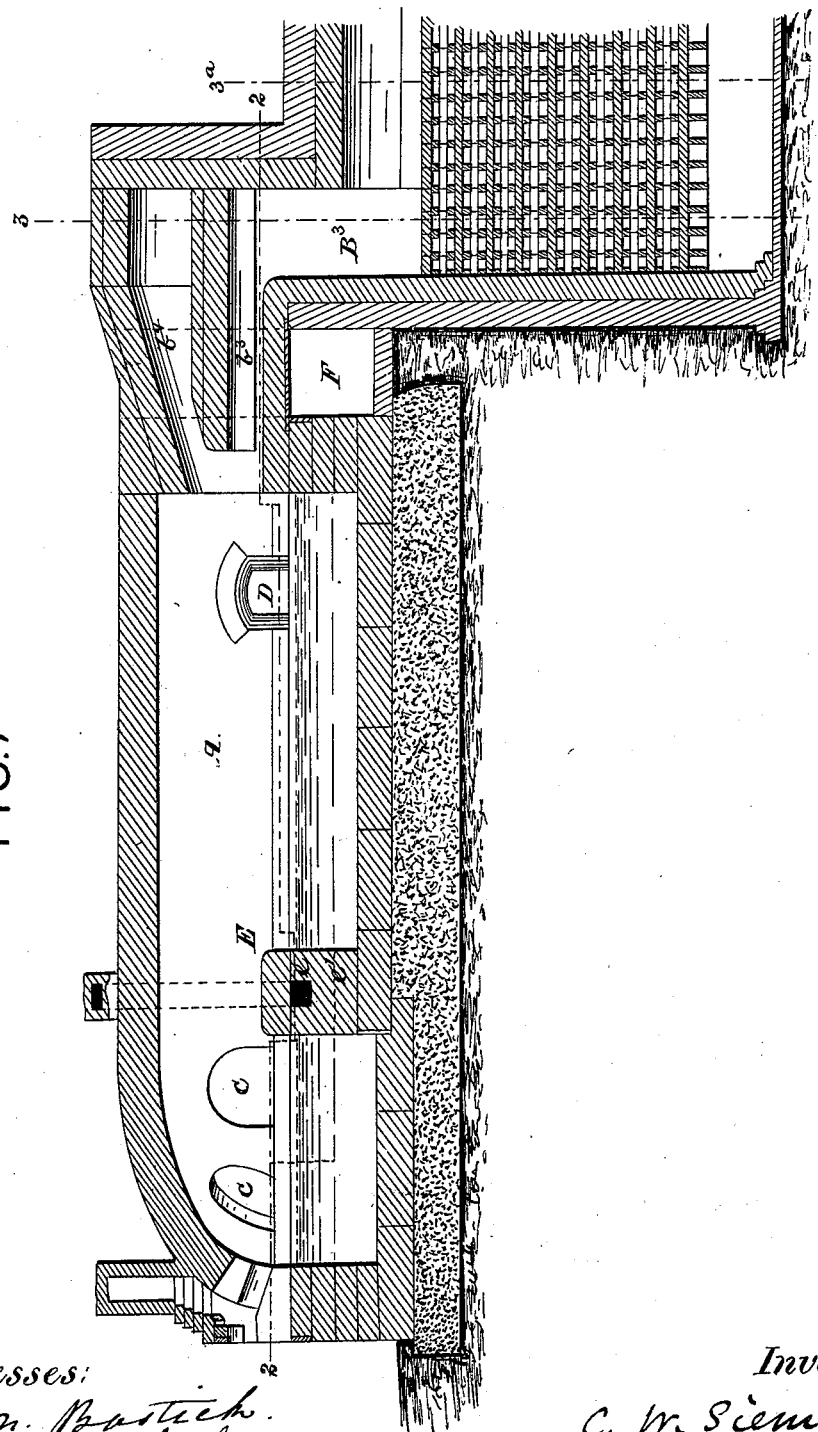
Figure 2:
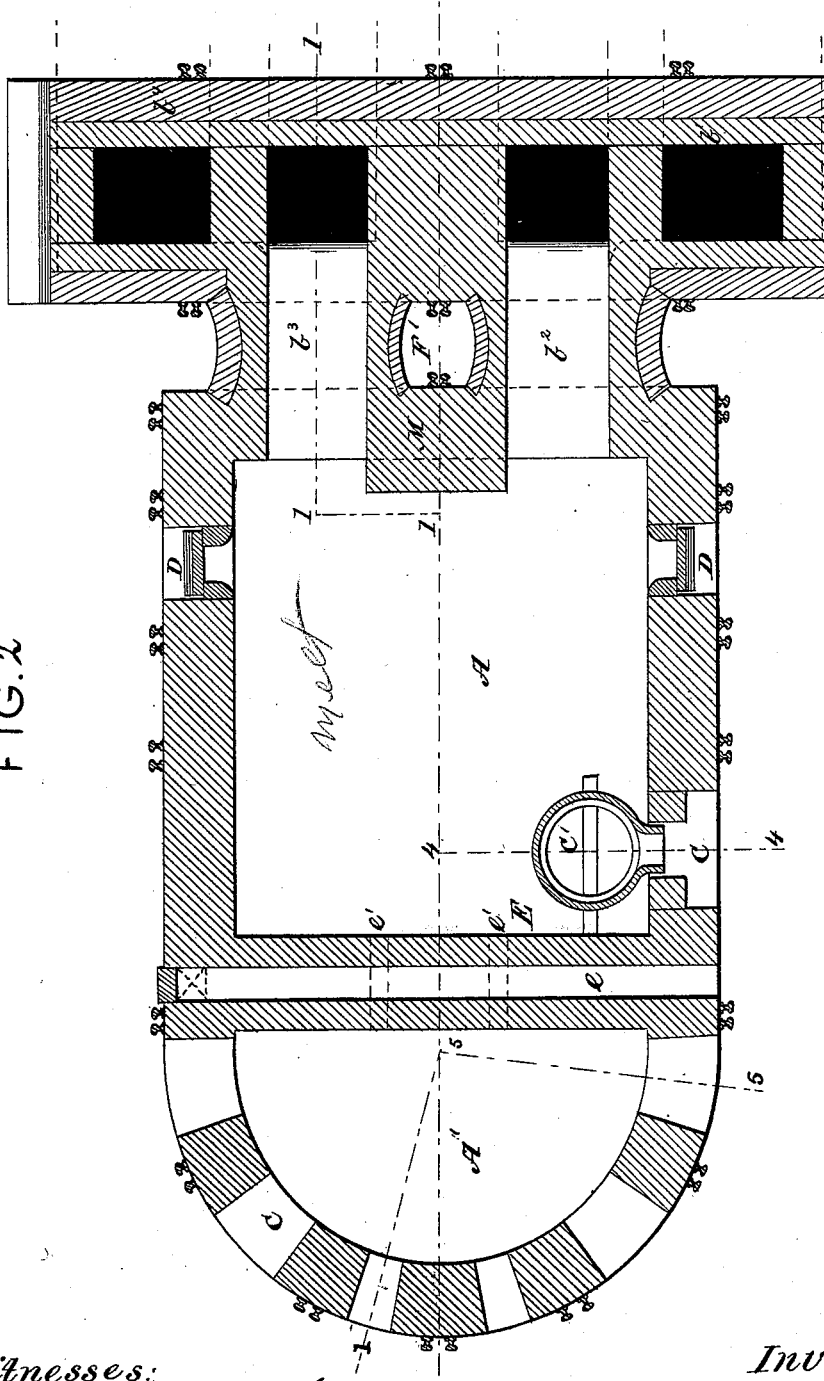
Figure 3:
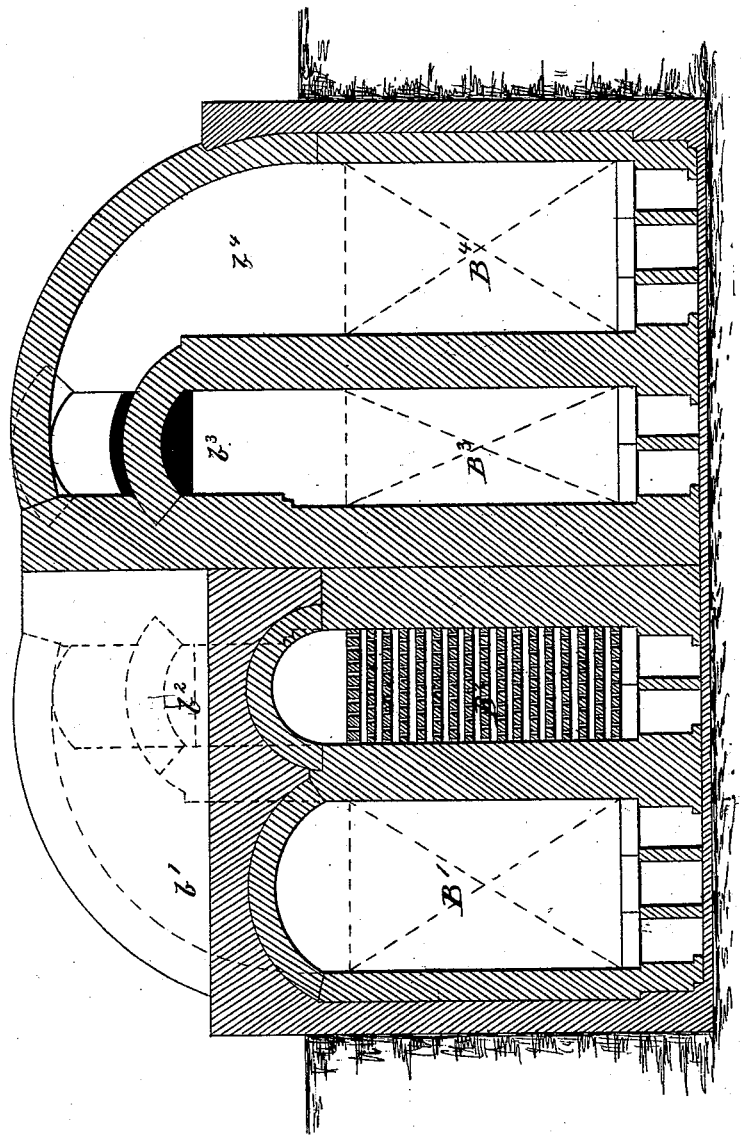
Figure 4:
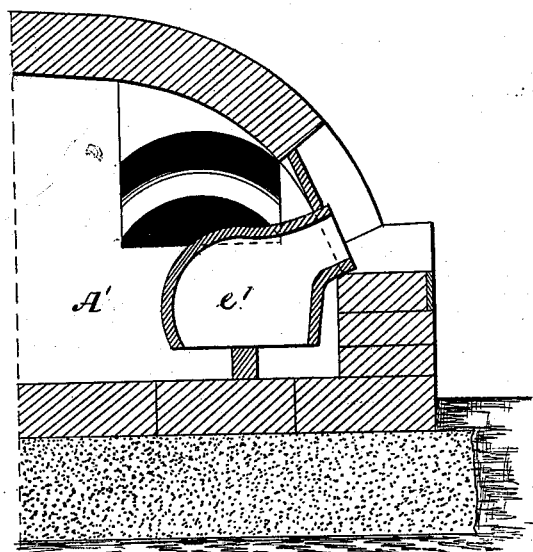
Figure 5:
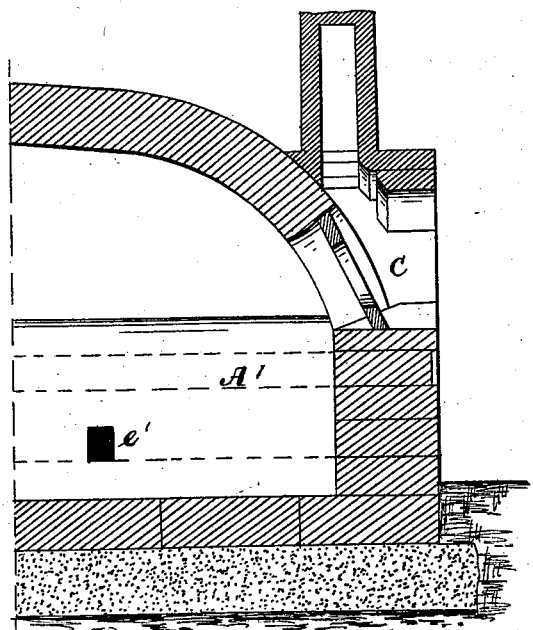

Be it known that I, CHARLES WILLIAM SIEMENS, of Westminster, England, have invented certain Improvements in the Construction and Methods of Working Glass - Melting Furnaces, (for which I have obtained a patent for Great Britain, No 1,551, bearing date the 28th day of April, in the year of our Lord 1875,) of which the following is a specification.
Formerly in the manufacture of glass the materials were first charged into glass pots or tanks, then melted down, and then worked out completely, after which they were recharged and the process repeated.
The loss of time and other disadvantages resulting from this method of working were in a measure obviated by the new process and apparatus described in Letters Patent of the United States No. 127,806, granted to me on the 11th day of June, in the year of our Lord 1872, in which was described a regenerative tank-furnace for the continuous melting of glass, constructed with transverse partitions dividing the tank into compartments, through which the melted materials were made to flow, while the gas and air ports were arranged along each side of the tank so as to cause the flame to play transversely across the same. By the use of this continuous-melting furnace a full and uninterrupted melting-heat could be employed, and no time was lost in cooling and settling the metal and reheating the furnace, the tank was rendered more durable by being subjected to a uniform temperature, and an economy in labor was effected in lessening the number of workmen required for the melting operations. In working the furnace, however, some difficulty has been experienced in cooling the exterior surface of the tank-bricks in a uniform and sufficient manner, and when, owing to the failure of the tank-bricks at any point, the metal has leaked out, it has choked the ventilating-flues, and thus given rise to considerable inconvenience.
My present invention relates to continuous glass-melting furnaces of this class; and the objects of my improvement are, first, to effect the uniform cooling of the exterior surface of the tank, and, second, to render the sides of the tank available for working out holes and charging doors. I attain these objects by placing the regenerators on one side of the melting-chambers and causing the combustible gases to enter and the products of combustion to leave the melting-chamber from the same side thereof. The remaining sides are then available for working out holes, which may be arranged in the manner most suitable for the work to be done.
In the accompanying plate of drawings, in which corresponding parts are designated by similar letters, Figure 1 is a longitudinal vertical section of the continuous glass-melting furnace, taken on the line 1 1 of Fig. 2. Fig. 2 is a sectional plan taken on the line 2 2 of Fig. 1. Fig. 3 shows on the right-hand side a transverse section on the line 3 3, Fig. 1, and on the left-hand a transverse section on the line $3^a$ $3^a$, Fig. 1. Fig. 4 is a vertical section taken on the line 4 4 of Fig. 2. Fig. 5 is a vertical section taken on the line 5 5 of Fig. 2.

A is the melting-chamber, at one side or end of which are placed the four regenerators $B'$ $B^2$ $B^3$ $B^4$, of which the one pair of air and gas regenerators, $B'$ $B^2$, communicate with the melting-chamber A through the passages $b'$ $b^2$, situated one above the other, while the other pair, $B^3$ and $B^4$, communicate with the chamber A through the corresponding passages $b^3$
$b^4$. Thus the gas and air passing into the chamber A through the one set of passages, $b'$ $b^2$, and being ignited, sweep round the melting-chamber and escape through the passages $b^3$ $b^4$ to the other pair of regenerators.

In order to secure a more complete sweep of the flame, the middle wall, M, may be extended toward the bridge. By this management the two sides and semicircular end of the furnace are rendered available for working holes C C and for charging doors D D, the latter being placed near the regenerators.

E is the fixed bridge, with a passage, $e$, formed right through it to a flue at one side, acting as a chimney for the circulation of the air, and with apertures $e'$ $e'$ at the bottom, through which the finer metal passes from the melting-chamber A into the compartment $A'$, whence it is worked out through the opening O.

A passage, F, is formed beneath the throats of the regenerators, communicating with a vertical passage, F', between the throats, for keeping the brick-work cool by the circulation of air.

The working-out holes may be provided with hoods or muffles C'.

Having thus described my invention, I claim and desire to secure by Letters Patent of the United States—

1. A regenerative tank-furnace for the continuous melting of glass, in which the regenerators and passages leading to and from the regenerators are situated entirely on one side of the tank, as and for the purposes described.

2. A regenerative tank-furnace for the continuous melting of glass, having the working-out doors at one end of the tank and the communications to and from the regenerators at the end opposite to the working-out doors, as and for the purposes described.

3. A regenerative tank-furnace for the continuous melting of glass, in which working-out or feeding doors may be formed on all sides of the tank except the side communicating with the regenerators, as and for the purposes described.

C. WILLIAM SIEMENS.

Witnesses:
CHAS. ROCHE,
THOS. MARCH,
Both of 2 Waterloo Place, Pall Mall, London, Notary's Clerks.